United States Patent
Gopal et al.

(10) Patent No.: US 10,275,217 B2
(45) Date of Patent: Apr. 30, 2019

(54) MEMORY LOAD AND ARITHMETIC LOAD UNIT (ALU) FUSING

(71) Applicant: Samsung Electronics Co., Ltd., Suwon-si, Gyeonggi-do (KR)

(72) Inventors: Rama S. Gopal, Austin, TX (US); Paul E. Kitchin, Austin, TX (US); Karthik Sundaram, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/612,963

(22) Filed: Jun. 2, 2017

(65) Prior Publication Data

US 2018/0267775 A1    Sep. 20, 2018

Related U.S. Application Data

(60) Provisional application No. 62/471,353, filed on Mar. 14, 2017.

(51) Int. Cl.
*G06F 7/38* (2006.01)
*G06F 7/485* (2006.01)
*G06F 7/50* (2006.01)

(52) U.S. Cl.
CPC .............. *G06F 7/485* (2013.01); *G06F 7/38* (2013.01); *G06F 7/50* (2013.01)

(58) Field of Classification Search
CPC .................................... G06F 7/48; G06F 7/485
See application file for complete search history.

(56) References Cited

U.S. PATENT DOCUMENTS

| 5,922,066 A | * | 7/1999 | Cho | G06F 5/015 |
| | | | | 712/204 |
| 6,216,200 B1 | | 4/2001 | Yeager | |
| 6,609,192 B1 | * | 8/2003 | Guthrie | G06F 9/30087 |
| | | | | 712/216 |
| 7,051,190 B2 | | 5/2006 | Samra et al. | |
| 7,398,372 B2 | | 7/2008 | Samra et al. | |
| 8,856,496 B2 | | 10/2014 | Henry et al. | |
| 8,943,119 B2 | | 1/2015 | Hansen et al. | |
| 2011/0035570 A1 | * | 2/2011 | Col | G06F 9/3001 |
| | | | | 712/23 |
| 2016/0179542 A1 | | 6/2016 | Lai et al. | |

OTHER PUBLICATIONS

Georganas, Evangelos, et al., "merAligner: A Fully Parallel Sequence Aligner", Parallel and Distributed Processing Symposium (IPDPS), 2015 IEEE, May 29, 2015, 5 pages.

* cited by examiner

*Primary Examiner* — Chuong D Ngo
(74) *Attorney, Agent, or Firm* — Renaissance IP Law Group LLP (57) ABSTRACT

According to one general aspect, a load unit may include a load circuit configured to load at least one piece of data from a memory. The load unit may include an alignment circuit configured to align the data to generate an aligned data. The load unit may also include a mathematical operation execution circuit configured to generate a resultant of a predetermined mathematical operation with the at least one piece of data as an operand. Wherein the load unit is configured to, if an active instruction is associated with the predetermined mathematical operation, bypass the alignment circuit and input the piece of data directly to the mathematical operation execution circuit.

20 Claims, 5 Drawing Sheets

MEMORY LOAD AND ARITHMETIC LOAD UNIT (ALU) FUSING

CROSS-REFERENCE TO RELATED APPLICATION

This application claims priority under 35 U.S.C. § 119 to Provisional Patent Application Ser. No. 62/471,353, entitled "MEMORY LOAD AND ARITHMETIC LOAD UNIT (ALU) FUSING" filed on Mar. 14, 2017. The subject matter of this earlier filed application is hereby incorporated by reference.

TECHNICAL FIELD

This description relates to computer architecture and more specifically to a memory load and arithmetic load unit (ALU) fusing architecture.

BACKGROUND

Processors (for example, central processing units (CPU) or cores) execute various types of instructions. Two typical types of instructions include a memory load (LD) instruction and an arithmetic or mathematical instruction (e.g., an addition (ADD) instruction). Often, to achieve high performance processor execution it is desirable to keep the latency of these instructions low.

Load instructions or operations are generally executed in a load/store unit (LSU) that interfaces directly with a level 1 data (L1D)-cache. Whereas, mathematical operations (e.g., ADD) are often executed in an arithmetic logic unit (ALU) or other mathematical execution unit (e.g., a floating-point unit (FPU)).

The latency of a load instruction in most processors typically varies between 3 to 5 cycles. Typically, such multi-cycle latency includes various complex operations, including, for example, translation lookaside buffer (TLB) address lookup, L1D-cache tag index lookup, tag physical address compare, L1D-cache data read, and alignment update of the data value. The alignment update is often involved because data is often read out of the data-cache aligned to a certain byte boundary (e.g., a particular word-size). However, the actual requested memory address may not occur at that pre-defined byte boundary (e.g., it may occur half-way through a word). Therefore, the data read out of the cache may need to be shifted in some fashion to receive the proper alignment to satisfy the load instruction. There can also be other operations performed on the data during this alignment phase, including sign extension and big-endian/small-endian manipulation.

Likewise, a mathematical instruction or operation may have its own latency from start to finish. For example, ADD instructions typically have single-cycle latency to execute the addition.

In some architectures, it is common for a load instruction to update a register value that is subsequently used as a source for a subsequent ADD instruction. The processor may execute an arithmetic operation that uses a memory read operation as a source operand. Typically, the latency of the load and mathematics instructions is the sum of the individual latencies of the individual instructions.

SUMMARY

According to one general aspect, a load unit may include a load circuit configured to load at least one piece of data from a memory. The load unit may include an alignment circuit configured to align the data to generate an aligned data. The load unit may also include a mathematical operation execution circuit configured to generate a resultant of a predetermined mathematical operation with the at least one piece of data as an operand. Wherein the load unit is configured to, if an active instruction is associated with the predetermined mathematical operation, bypass the alignment circuit and input the piece of data directly to the mathematical operation execution circuit.

According to another general aspect, a system may include a mathematical execution unit that includes combinatorial logical circuits and configured to perform a plurality logical operations based upon an instruction and at least one piece of data. The system may also include a combined load-store/mathematical unit. The combined load-store/mathematical unit configured to both: load a piece of data from a memory, and based upon an active instruction, perform a predetermined one of the plurality of logical operations based upon the piece of data. The system may be configured to, if the active instruction is at least associated with the predetermined one of the plurality of logical operations, assigning the instruction to be executed by the combined load-store/mathematical unit instead of the mathematical execution unit.

According to another general aspect, a method of employing a load unit may include loading a piece of data from a memory. The method may include determining, based at least in part upon an active instruction, whether to transfer the piece of data to an execution unit, or to generate, within the load unit, a resultant based upon the piece of data. Wherein if the piece of data is transferred to an execution unit, aligning the piece of data prior to transferring the piece of data. Wherein if a resultant is generated, generating a plurality of alignments of the piece of data and generating the resultant of a predetermined mathematical operation based upon the at least one of the plurality of alignments of the piece of data.

The details of one or more implementations are set forth in the accompanying drawings and the description below. Other features will be apparent from the description and drawings, and from the claims.

A system and/or method for computer architecture and more specifically to a memory load and arithmetic load unit (ALU) fusing architecture, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
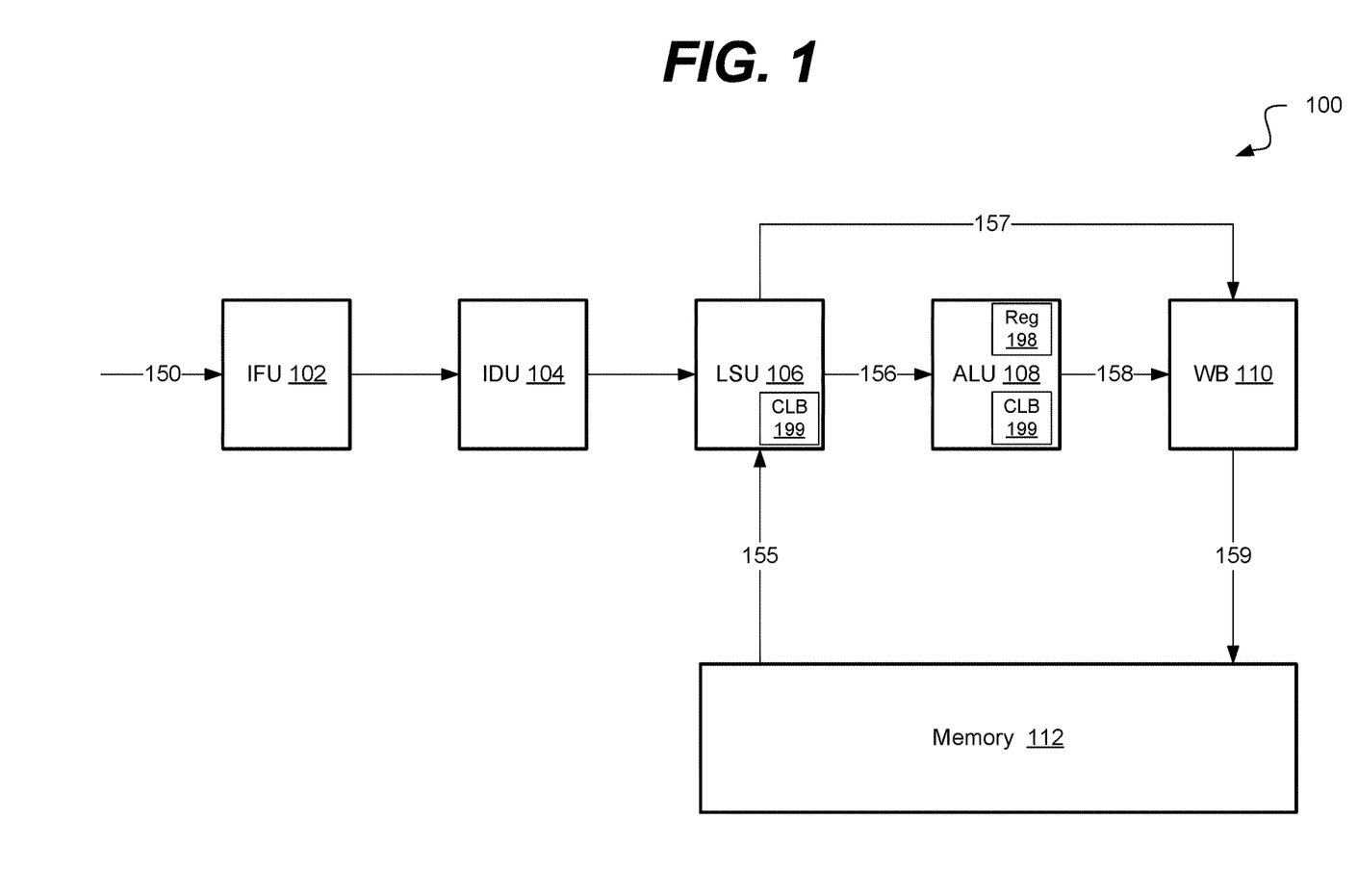
FIG. 1 is a block diagram of an example embodiment of a system in accordance with the disclosed subject matter.

FIG. 1 is a block diagram of an example embodiment of a system 100 in accordance with the disclosed subject matter. In the illustrated embodiment, the system 100 is a simplified architectural diagram of a pipelined processor. It is understood that the above is merely one illustrative example to which the disclosed subject matter is not limited.

In the illustrated embodiment, the system 100 may include an instruction fetch unit (IFU) 102. The IFU 102 may be configured to fetch or load an instruction 150. In such a pipelined embodiment, the instruction 150 that is acted on or processed by a given unit (e.g., the IFU 102, and an instruction decode unit (IDU) 104) may be referred to as that unit's active instruction.

The system 100 may also include the IDU 104 configured to decode an active instruction and determine how it should be routed or processed by the system 100. In the illustrated embodiment, the instruction 150 may be a simple mathematical instruction and may need data loaded from a memory to act as an operand to the mathematical operation, and be processed by a mathematical execution unit to generate a resultant.

In the illustrated embodiment, the instruction 150 may involve an arithmetic logic unit (ALU) 108. However, in other embodiments, a different version of the instruction 150 may involve other (un-shown) pipeline stages or units, such as, for example, single-instruction-multiple-data (SIMD) stages, multi-accumulate stages, data movement (e.g., loads and stores). It is understood that the above are merely a few illustrative examples to which the disclosed subject matter is not limited.

In the illustrated embodiment, the system may include a load-store unit (LSU) 106. The LSU 106 may be configured to, among other things, load data from a memory (e.g., memory 112) and store data either back to the memory 112 or to a register within the system 100 (e.g., a register 198 that is part of another unit).

In a more traditional system, the LSU 106, as described above, aligns or otherwise configures and corrects the formatting of the piece of data (e.g., sign extension, and endian operations) and then pass the aligned piece of data 156 to the mathematical execution unit. In the illustrated embodiment, the mathematical execution unit may include the arithmetic logic unit (ALU) 108. Herein the term "aligned piece of data 156" refers to any data that has been conditioned or processed by the LSU 106, regardless of whether the data was aligned, sign extended, endian corrected, similarly processed, or merely checked to determine that such processing was not required.

In the illustrated embodiment, the ALU 108 may be configured to perform a plurality of mathematical operations (e.g., addition, subtraction, multiplication, and division) on the piece of data and generate a resultant 158. The given instruction 150 may determine which of those mathematical operations is to be performed on the data (e.g., an addition instruction). In some embodiments, the active instruction (e.g., ADD) may require two or more operands. In such an embodiment, any additional operands may have already been loaded and placed in a register that the ALU 108 may access (e.g., register 198).

In the illustrated embodiment, the ALU 108 may then pass the resultant 158 to a write-back (WB) unit 110. The WB 110 may be configured to write the resultant 159 back to the memory 112 or to another register. In various embodiments, the WB unit 110 may be the LSU 106. In another embodiment, the WB unit 110 may be the ALU 108. In yet another embodiment, the WB unit 110 may include a separate unit, entirely. It is understood that the above are merely a few illustrative examples to which the disclosed subject matter is not limited.

In various embodiments, the processing time taken by each unit may vary. For example, despite being shown (for illustrative proposes) as five pipeline stages, in some architectures (e.g., the Advanced RISC Machine (ARM) Processors) the IFU 102 stage may take 2-3 clock cycles, the LSU 106 may include one or more read clock cycles and an alignment or shift clock cycle (for 2 or more total clock cycles), and the ALU 108 may take 2 clock cycles (e.g., operation and saturation). Therefore, as a non-limiting example, the latency incurred by the LSU 106 and ALU 108 may include 4 clock cycles. Plus, the passing of data from the LSU 106 to the ALU 108 may involve shipping that data 156 from one end of the processor to the other end of the processor.

In the illustrated embodiment, the LSU 106 may include the ability or circuitry to perform one or more mathematical operations. Specifically, the LSU 106 may be configured to perform one or more of the mathematical operations that may also be performed by the ALU 108. In such an embodiment, the LSU 106 may be referred to as a combined load-store/mathematical unit or a LSU with a mini-ALU integrated within it.

In such an embodiment, if the active instruction is one that indicates that the data 155 is to be used as an operand for the mathematical operation that can be performed by the LSU 106, the LSU 106 may bypass or circumvent a number of traditional actions, described above, and simply generate the resultant 157 itself.

As will be described in more detail in reference to the other figures, in such an embodiment, the LSU 106 may load or fetch the data 155, as described above. In a slower embodiment that saves the bandwidth of transferring that aligned data but not the latency of the faster embodiment described next, the LSU 106 may then align the data, as described above. The LSU 106, using its internal mathematical operation execution circuit (e.g., combinatorial logic block or circuit 199), may then perform the mathematical operation (e.g., ADD) on the aligned data 156 to generate the resultant 157. This resultant 157 may be transferred to the WB unit 110. In some embodiments, if the WB unit 110 is the LSU 106 (which it likely, but not necessarily, would be in this embodiment) the transfer may be conceptual instead of physical. The WB unit 110 may then store the resultant 157 as illustrated resultant 159. In such an embodiment, the bandwidth involved in transferring the aligned data 156 may be saved, and if the mathematical operation is simple and involves fewer cycles than the ALU 108 would use, performing the operation in the LSU 106 may save some latency.

In another, faster embodiment, the LSU 106 may be configured to skip, bypass, or circumvent the alignment operation (saving the latency of that operation, for example a clock cycle). Instead, in such an embodiment, the LSU 106 may perform the mathematical operation on the unaligned data 155. The LSU may then generate the resultant 157 and again bypass the ALU 108 entirely. In such an embodiment, both the bandwidth of transferring the aligned data 156 and the latency of the ALU 108 cycles and the alignment cycle(s) of the LSU 106 may be saved. In such an embodiment, the cycle used for alignment may be spent computing the mathematical operation.

In one embodiment, the active instruction may determine whether or not the mathematical operation is performed by the LSU 106 or the ALU 108. In some embodiments, the LSU 106 may examine the active instruction and determine if it coincides with a mathematical operation that can be performed by the LSU 106. If so, the LSU 106 may simply perform the operation instead of passing it to the ALU 108.

In another embodiment, an external (to the LSU 106) unit (e.g., the IDU 104) may determine whether the instruction should be performed by the LSU 106 or the ALU 108. In one such embodiment, the IDU 104 may make this determination based upon a single instruction or, in another embodiment, the IDU 104 may make this determination based upon multiple, related instructions (e.g., a load instruction that is followed by an addition instruction that uses the same data, or register congestion).

In yet another embodiment, a combined instruction (e.g., a combined LOAD-ADD instruction), may indicate that the LSU 106 is to be used, whereas separate instructions (e.g., a LOAD instruction followed by an ADD instruction) may indicate that the ALU 108 is to be used. It is understood that the above are merely a few illustrative examples to which the disclosed subject matter is not limited.

In the illustrated embodiment, while the units (e.g., the IFU 102, the LSU 106) are referred to as "units", it is understood that they are circuits. And that each unit includes a collection of circuits logically grouped together to perform one or more tasks or operations. (e.g., fetch an instruction, perform a mathematical operation). Likewise, each unit includes a plurality of combinatorial logic blocks (CLBs) 199 which are also circuits. The CLBs 199 are smaller groupings of circuits that perform more primitive tasks or operations (e.g., add two operands together, align data).

Further, while the illustrated embodiment shows the ALU 108 being bypassed (or partially integrated into the LSU 106), it is understood that disclosed subject matter is not limited to any one execution unit or even one mathematical execution unit. In various embodiments, the LSU 106 could be configured to perform one or more operations performed by another execution unit, such as for example, a floating-point unit, or a graphics unit. Likewise, while the operation is integrated into the LSU 106 the disclosed is not limited to a unit that has the ability to store data, and may just include a unit that loads data. It is understood that the above are merely a few illustrative examples to which the disclosed subject matter is not limited.

Furthermore, while for the sake of simplification and illustration the addition (ADD) operation is used herein as the example mathematical operation, it is understood that other, indeed any, mathematical or non-mathematical operation may be integrated into the LSU 106. Although the present disclosure is described using an ADD instruction in the ALU, it is appreciated that the present system and method may be extended to include other types of arithmetic operations (e.g., subtract, add with carry, subtract with borrow, two's complement, increment, decrement, and pass through), logical shifts, rotations, and bitwise operations performed by the ALU (or anther mathematical execution unit) without deviating from the scope of the present disclosure.

Figure 2:
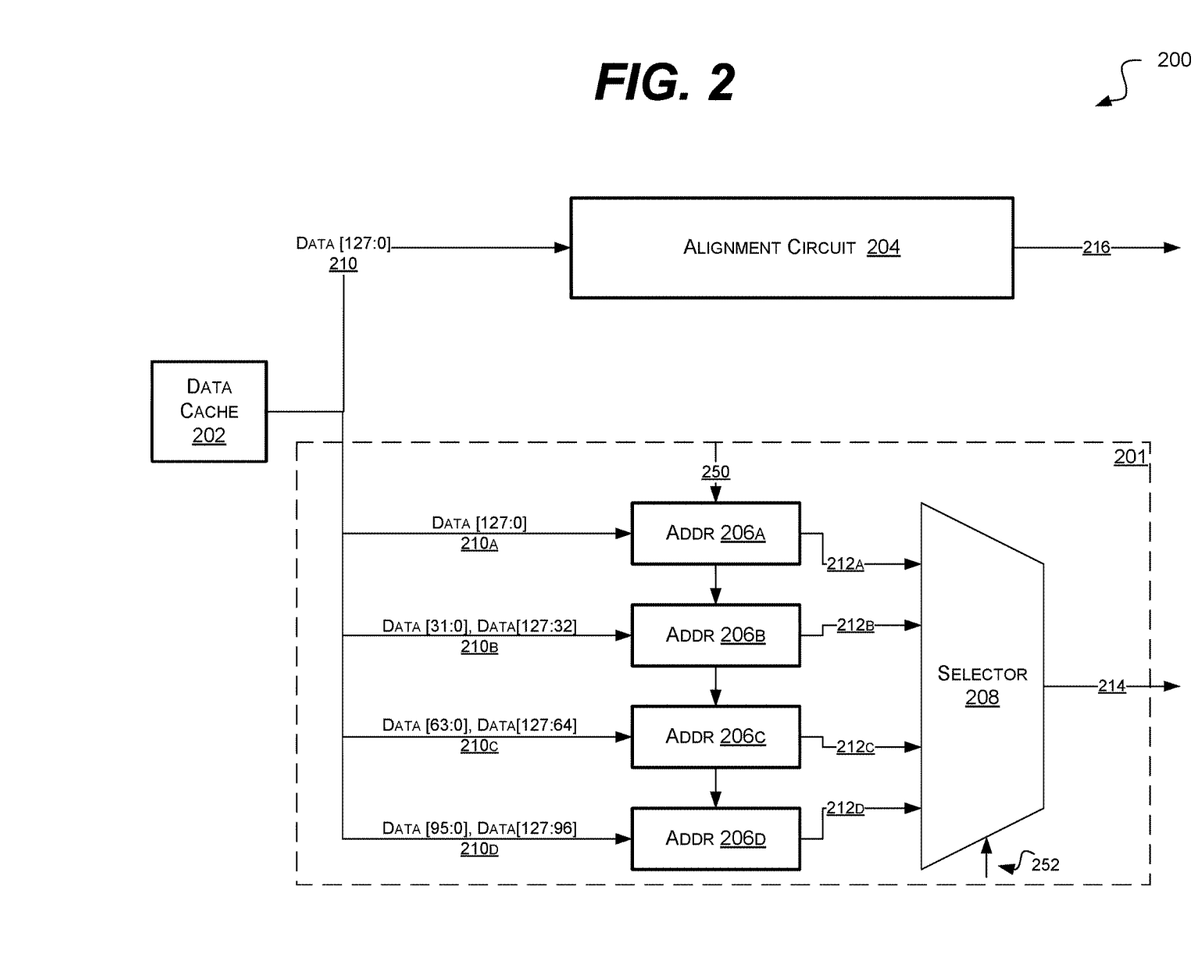
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a load-store unit or a combined load-store/mathematical unit, as described above. It is understood that the above is merely one illustrative example to which the disclosed subject matter is not limited.

In the illustrated embodiment, the system 200 may include or access a memory, such as a data cache 202. In various embodiments, the system 200 may retrieve, read, fetch, or load data 210 from the data cache 202. In the illustrated embodiment, the data 210 may include a 128-bit word; although, it is understood that the above is merely one illustrative example to which the disclosed subject matter is not limited.

In various embodiments, the system 200 may include an alignment circuit 204. In some embodiments, the alignment circuit 204 may be configured to perform word alignment, as described above. In another embodiment, the alignment circuit 204 may also or alternatively perform one or more additional data conditioning services, such as for example, sign extension or endian operations. It is understood that the above are merely a few illustrative examples to which the disclosed subject matter is not limited.

The alignment circuit 204 may produce or generate the aligned data 216. In various embodiments, the act of loading the data 210 may take a first clock cycle or pipeline stage, and the act of alignment (via the alignment circuit 204) may take a second clock cycle or pipeline stage. It is understood that the above is merely one illustrative example to which the disclosed subject matter is not limited.

In the illustrated embodiment, the system 200 may also include a mathematical operation execution circuit 201. In such an embodiment, the system 200 may drive these two circuits (the alignment circuit 204 and the mathematical operation execution circuit 201) substantially in parallel. In various embodiments, the system 200 may select either the alignment circuit 204 or the mathematical operation execution circuit 201 to drive, and halt or put to sleep (or in a low-power mode) the mathematical operation execution circuit 201 or the alignment circuit 204 respectively. As described above, this may be done based upon the active instruction or a signal from an external unit (e.g., an IDU). In another embodiment, the alignment circuit 204 and the mathematical operation execution circuit 201 may both compute their respective results 216 and 214 and the unwanted result may simply be ignored. It is understood that the above are merely a few illustrative examples to which the disclosed subject matter is not limited.

In the illustrated embodiment, the mathematical operation execution circuit 201 may be configured to perform a predefined mathematical operation, such as, for example, an addition. In such an embodiment, the operation may take the data 210 (or a version thereof) as an input operand and output the resultant 214. In various embodiments, the operation may require a second (or more) operand(s). In such an embodiment, this operand 250 may be supplied via a register (not shown) or a second load operation.

In the illustrated embodiment, the mathematical operation execution circuit 201 may include a number of combinatorial logical circuits (e.g., adders 206A, 206B, 206C, and 206D). In such an embodiment, these combinatorial logical circuits may be substantially identical such that they all perform the same mathematical operation. These combinatorial logic circuits may be arranged in parallel, such that they may all compute their respective resultants (e.g., resultants 212A, 212B, 212C, and 212D) substantially simultaneously.

In the illustrated embodiment, if the data 210 skips or bypasses the alignment circuit 204, the data 210 may not be properly aligned. Therefore, if a given combinatorial logical circuit was to perform the operation on the unaligned data, the resultant may be incorrect. In order to compensate for this, the mathematical operation execution circuit 201 may perform the operation upon a plurality of versions of the data 210. Each version of the data 201 may be aligned in a different way. One of those versions will be the correctly aligned version of the data 210. The combinatorial logical circuit that uses that correctly aligned version of the data 210 will produce the correct resultant and the resultants from the other combinatorial logical circuits will just be ignored.

In the illustrated embodiment, the four adders 206A, 206B, 206C, and 206D are used. Likewise, there are four alignment variations of the data 210 being feed into the respective adders. It is understood that the above number of four is merely one illustrative example to which the disclosed subject matter is not limited.

The first alignment version 210A is the same as the unaligned data with bits 127-0 in their unaltered order. Alignment version 210B has rotated the data 210 by 32-bits, such that bits 31-0 are now the most-significant bits (MSBs) and bits 127-32 are shifted accordingly. Alignment version 210C has rotated the data 210 by 64-bits, such that bits 63-0 are now the most-significant bits (MSBs) and bits 127-64 are shifted accordingly. Alignment version 210D has rotated the data 210 by 96-bits, such that bits 95-0 are now the most-significant bits (MSBs) and bits 127-96 are shifted accordingly. Versions 210A, 210B, 210C, and 210D, are input to Adders 206A, 206B, 206C, and 206D, respectively. Adders 206A, 206B, 206C, and 206D take their versions of data 210 and the second operand 250, perform addition upon them, and output the candidate resultants 212A, 212B, 212C, and 212D respectively.

In the illustrated embodiment, the mathematical operation execution circuit 201 may include a selector circuit 208 (e.g., a multiplexer (MUX)). In such an embodiment, the selector circuit 208 may be configured to select between the candidate resultants 212A, 212B, 212C, and 212D in order to choose the ultimate resultant 214. In various embodiments, this may be done via the selection signal 252.

In some embodiments, the alignment circuit 204 may operate in parallel with the mathematical operation execution circuit 201. In such an embodiment, by the time the adders have finished computing their resultants, the alignment circuit 204 may have determined what the correct alignment of the data 210 should be. In such an embodiment, the alignment circuit 204 may then generate or supply the selection signal 252. In another embodiment, the selection signal 252 may be generated by another circuit (not shown). It is understood that the above are merely a few illustrative examples to which the disclosed subject matter is not limited.

In various embodiments, the resultant 214 may be written back to a memory or placed in a register, as desired. In either case, the aligned data 216 need not be forwarded to the more advanced mathematical execution unit (e.g., an ALU). As described above, the more advanced mathematical execution unit (e.g., an ALU) may be configured to perform a plurality of various mathematical operations, whereas the system 200 may be configured to simply perform one mathematical operation. In such an embodiment, the system 200 may be employed for quick, simple mathematical operations and the more advanced mathematical execution unit may be used for more complex operations or operations in which the operands are already stored in, for example, the advanced mathematical execution unit's registers. It is understood that the above are merely a few illustrative examples to which the disclosed subject matter is not limited.

Returning to the ability of the system 200 to drive the alignment circuit 204 and the mathematical operation execution circuit 201 in parallel, in various embodiments, a new or combined instruction may exist that instructs the system 200 to perform two operations. For example, a combined LOAD-ADD (LD, ADD) may exist in which two outputs are desired. As part of the Load portion of the LD, ADD instruction the aligned data 216 may be an output, and as part of the Add portion of the LD, ADD instruction the resultant 214 may be an output. In another embodiment, a combined instruction like LD, ADD may simply result in the single output of the resultant 214. It is understood that the above are merely a few illustrative examples to which the disclosed subject matter is not limited.

In some embodiments, the combined instruction LD, ADD (or similar) may be included as part of the instruction set architecture (ISA). In another embodiment, the combined instruction LD, ADD may be a low-level instruction (e.g., a micro-operation) generated dynamically when two or more larger or higher-level instructions are recognized that can be combined or fused to form the combined instruction. For example, a Load followed by an Add may be combined or fused to form the LD, ADD. In some embodiments, this may be done by the IDU or other circuit. Although, it is understood that in various embodiments, the single ADD instruction alone may be enough to cause the selection of the mathematical operation execution circuit 201 versus the more advanced mathematical execution unit (e.g., an ALU).

Figure 3:
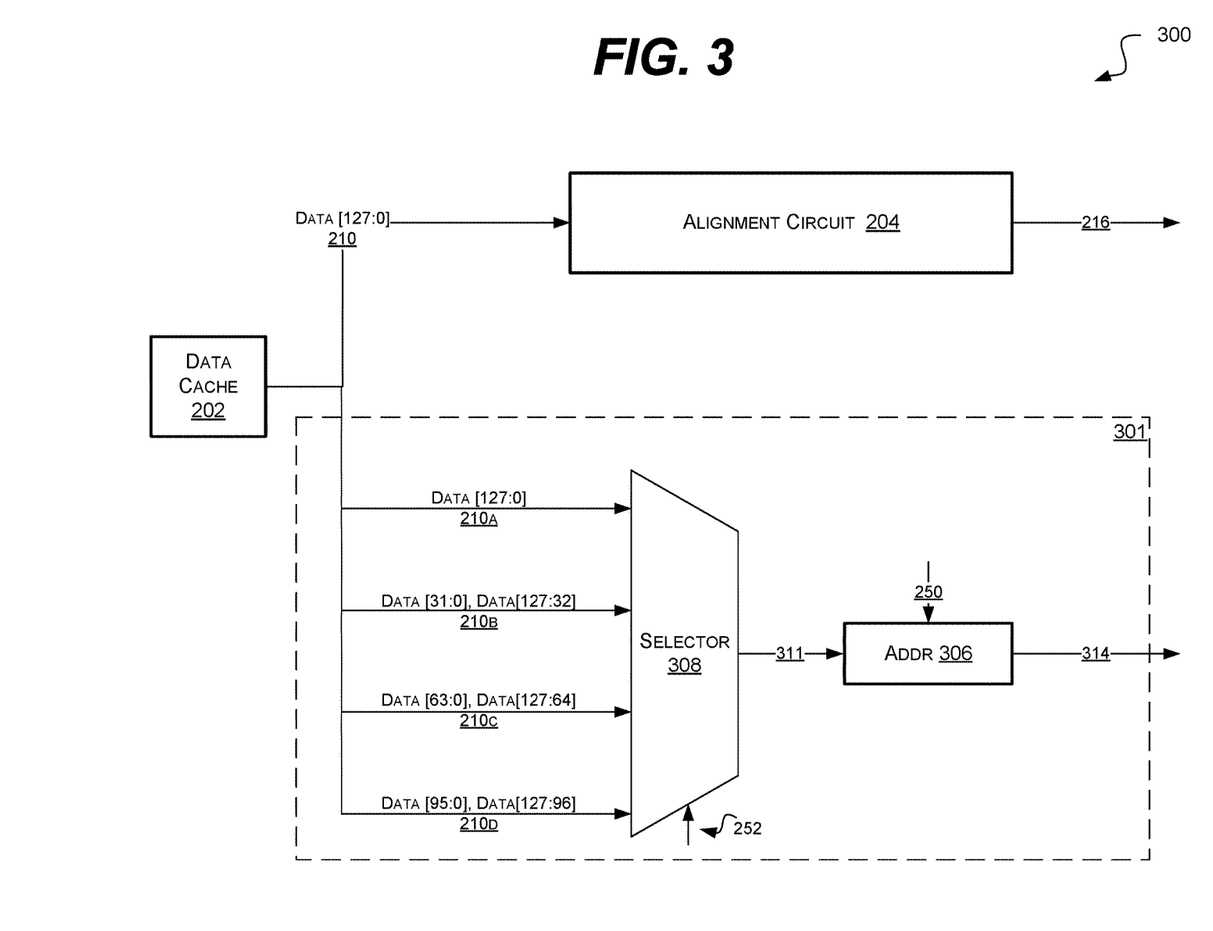
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a load-store unit or a combined load-store/mathematical unit, as described above. It is understood that the above is merely one illustrative example to which the disclosed subject matter is not limited.

In the illustrated embodiment, the system 300 may fetch or load data 210 from the data cache 202. It may then process the data 210 in the alignment circuit 204 and produce the aligned data 216, as described above. Also, the system 300 may include mathematical operation execution circuit 301 that performs a predetermined mathematical operation (e.g., addition) and generates the resultant 314.

In the illustrated embodiment, the order of actions in the mathematical operation execution circuit 301 may be reversed from that shown in the mathematical operation execution circuit 201 of FIG. 2. In such an embodiment, the alignment variations or versions of the data 210A, 210B, 210C, and 210D may first pass through the selector 308. The selector 308 may output an aligned or selected version of the data 311. In some embodiments, this may the same as the aligned data 216.

The selected version of the data 311 may be given, as an operand, to the combinatorial logical circuit (e.g., adder) 306. The combinatorial logical circuit 306 may then use the selected version of the data 311 and any other operands 250 to generate the resultant 314. In such an embodiment, the duplication of circuitry (and the corresponding extra power consumption and area consumption) may be avoided. It is understood that the above is merely one illustrative example to which the disclosed subject matter is not limited.

Figure 4:
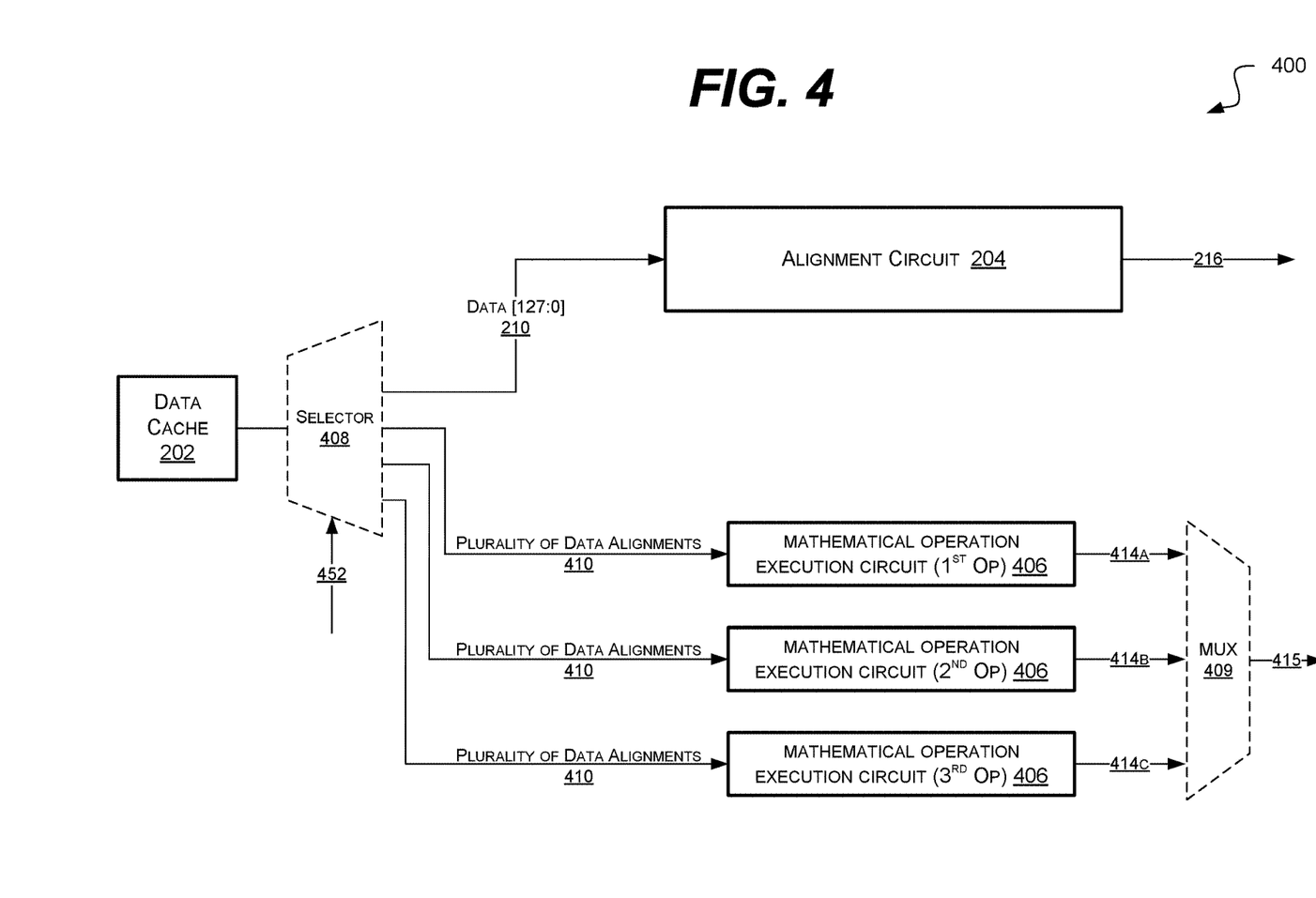
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include a load-store unit or a combined load-store/mathematical unit, as described above. It is understood that the above is merely one illustrative example to which the disclosed subject matter is not limited.

In the illustrated embodiment, the system 400 may load or fetch data 210 from the data cache 202 and align it using the alignment circuit 204. The alignment circuit may generate the aligned data 216, as described above.

In the illustrated embodiment, the system 400 may include not just one mathematical operation execution circuit (as shown in FIGS. 2 and 3), but a plurality of mathematical operation execution circuits 406. In such an embodiment, each mathematical operation execution circuit 406 may be configured to execute or perform a mathematical operation. For example, one mathematical operation execution circuit 406 may be configured to perform a first operation (e.g., Add), another mathematical operation execution circuit may be configured to perform a second operation (e.g., subtraction), and yet another mathematical operation execution circuit may be configured to perform a third operation (e.g., two's compliment conversion). It is understood that the above are merely a few illustrative examples to which the disclosed subject matter is not limited.

In such an embodiment, if an active instruction is associated with any of these mathematical operations, the system 400 may be assigned to complete the operation instead of the operation being transferred to a more advanced execution unit (e.g., the ALU). As described above, in some embodiments, the system 400 may make use of special instructions (e.g., LD, ADD) that indicate when the operation should be performed by the system 400. In another embodiment, the processor may detect when such an assignment would be desirable and instruct the system 400 accordingly.

In various embodiments, the system 400 may include a selector circuit 408 (e.g., a demultiplexer (deMUX) configured to route the data 210 to either the alignment circuit 204 or a selected one of the mathematical operation execution circuits 406. In another embodiment, the selector circuit 408 may be moved to only select between the plurality of mathematical operation execution circuits 406, and the alignment circuit 204 may continue to operate in parallel to the selected mathematical operation execution circuit 406. In various embodiments, the selector circuit 408 may be controlled by the control signal 452.

In the illustrated embodiment, each mathematical operation execution circuits 406 may receive the plurality of data alignments 410, as described above. In some embodiments, the plurality of alignments 410 may be tailored to the specific mathematical operation. Although, in various embodiments, the plurality of data alignments 410 may be identical.

In various embodiments, each of the mathematical operation execution circuits 406 may include combinatorial logic blocks or circuits, and selector circuits similar to those described in reference to FIGS. 2 and 3. Each mathematical operation execution circuits 406 may produce a respective resultant 414A, 414B, and 414C. In various embodiments, a second selector circuit 409 (e.g., a MUX) may select between the resultants of the individual circuits. In such an embodiment, the system 400 may output the aligned data 216 and a single resultant 415. It is understood that the above is merely one illustrative example to which the disclosed subject matter is not limited.

Figure 5:
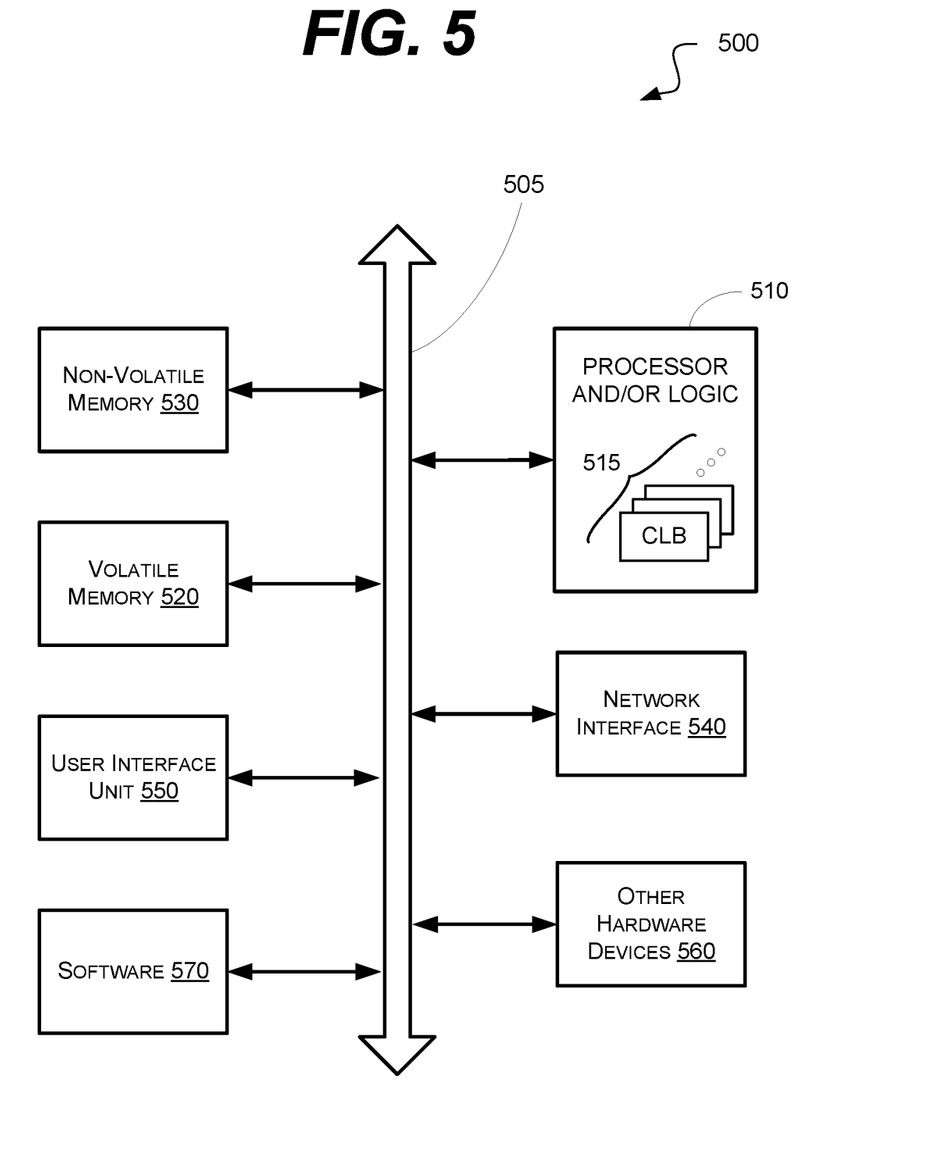
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM)). The information processing system 500 according to the disclosed subject matter may further include a non-volatile memory 530 (e.g., a hard drive, an optical memory, a NAND or Flash memory). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 500 according to the disclosed subject matter may further include a user interface unit 550 (e.g., a display adapter, a haptic interface, a human interface device). In various embodiments, this user interface unit 550 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540) of the information processing system 500. In such an embodiment, the information processing system 500 may include one or more native applications, which may be installed locally (e.g., within the non-volatile memory 530) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A load unit comprising:
a load circuit configured to load at least one piece of data from a memory;
an alignment circuit configured to align the data to generate an aligned data;
a mathematical operation execution circuit configured to generate a resultant of a predetermined mathematical operation with the at least one piece of data as an operand; and
wherein the load unit is configured to:
determine whether, an active instruction is associated with the predetermined mathematical operation, and
in response to determining that the active instruction is associated with the predetermined mathematical operation, bypass the alignment circuit and input the piece of data directly to the mathematical operation execution circuit.

2. The load unit of claim 1, wherein the mathematical operation execution circuit comprises a plurality of substantially identical combinatorial logical circuits,
wherein each of the plurality of substantially identical combinatorial logical circuits is configured to perform substantially the same mathematical operation upon a respective version of the piece of data, wherein each of the respective versions of the piece of data include a one of a plurality of alignments of the piece of data.

3. The load unit of claim 2, wherein the mathematical operation execution circuit comprises an alignment selector configured to select, based at least upon the alignment of the respective version of the piece of data, which output of the plurality of substantially identical combinatorial logical circuits is associated is the resultant.

4. The load unit of claim 1, wherein the mathematical operation execution circuit is configured to:
select between a plurality of alignment variations of the piece of data, and
input a selected alignment variation of the piece of data to a combinatorial logical circuit; and
the combinatorial logic circuit is configured to generate the resultant by performing a mathematical operation upon, at least, the selected alignment variation of the piece of data.

5. The load unit of claim 1, wherein the alignment circuit and the mathematical operation execution circuit are arranged in parallel.

6. The load unit of claim 1, wherein the predetermined mathematical operation comprises addition.

7. The load unit of claim 1, wherein the mathematical operation execution circuit is configured to generate the resultant with less latency than generating the aligned data, passing the aligned data to an execution unit that also performs the predetermined mathematical operation, and generating, by the execution unit, the execution unit's version of the resultant.

8. The load unit of claim 1, wherein the active instruction that causes the load unit to bypass the alignment circuit indicates that both a load operation and the predetermined mathematical operation are to be performed.

9. The load unit of claim 1, further comprising:
a pipeline management circuit is configured to indicate whether the active instruction is associated with the predetermined mathematical operation, wherein
the load unit is configured to, if the pipeline management circuit indicates that the active instruction is associated with the predetermined mathematical operation, bypass the alignment circuit.

10. A system comprising:
a mathematical execution unit that includes combinatorial logical circuits and configured to perform a plurality of substantially identical logical operations based upon an instruction and at least one piece of data;
a combined load-store/mathematical unit configured to both:
load a piece of data from a memory, and
based upon an active instruction, perform a predetermined one of the plurality of substantially identical logical operations based upon the piece of data, wherein selection of the predetermined one of plurality of substantially logical operations is based, at least in part, upon an alignment of the piece of data; and wherein the system is configured to:
  determine whether the active instruction is at least associated with the predetermined one of the plurality of logical operations, and
  in response to determining that the active instruction is at least associated with the predetermined one of the plurality of logical operations, assigning the instruction to be executed by the combined load-store/mathematical unit instead of the mathematical execution unit.

11. The system of claim 10,
  wherein each of the plurality of substantially identical combinatorial logical circuits is configured to perform substantially the same mathematical operation upon a respective version of the piece of data, wherein each of the respective versions of the piece of data include a one of a plurality of alignments of the piece of data.

12. The system of claim 11, wherein the combined load-store/mathematical unit comprises an alignment selector configured to select, based at least upon the alignment of the respective version of the piece of data, which output of the plurality of substantially identical combinatorial logical circuits is associated is a resultant.

13. The system of claim 10, wherein the combined load-store/mathematical unit is configured to:
  select between a plurality of alignment variations of the piece of data, and
  input a selected alignment variation of the piece of data to a combinatorial logical circuit; and
  the combinatorial logic circuit is configured to generate a resultant by performing a mathematical operation upon, at least, the selected alignment variation of the piece of data.

14. The system of claim 10, wherein the mathematical operation comprises addition.

15. The system of claim 10, wherein the combined load-store/mathematical unit is configured to generate a resultant with less latency than if the combined load-store/mathematical unit loaded the piece of data from a memory, passed the piece of data to the mathematical execution unit, and the mathematical execution unit generated the mathematical execution unit's version of the resultant.

16. The system of claim 10, wherein the system is configured to:
  determine whether the active instruction is associated with both a load operation and the predetermined one of the plurality of logical operations, and
  in response to determining that the active instruction is associated with both a load operation and the predetermined one of the plurality of logical operations, assigning the instruction to be executed by the combined load-store/mathematical unit instead of the mathematical execution unit.

17. A method of employing a load unit comprising:
  loading a piece of data from a memory;
  determining, based at least in part upon an active instruction, whether to transfer the piece of data to an execution unit, or to generate, within the load unit, a resultant based upon the piece of data;
  wherein if the piece of data is transferred to an execution unit, aligning the piece of data prior to transferring the piece of data; and
  wherein if a resultant is generated by the load-store unit, generating a plurality of alignments of the piece of data and generating the resultant of a predetermined mathematical operation based upon the at least one of the plurality of alignments of the piece of data.

18. The method of claim 17, wherein generating the resultant of comprises:
  generating a plurality of resultant variations by performing the predetermined mathematical operation upon a plurality of alignment variations of the piece of data; and
  selecting one of the plurality of resultant variations as the resultant of the predetermined mathematical operation.

19. The method of claim 17, wherein generating the resultant of comprises:
  selecting one of the alignments of the piece of data,
  generating the resultant of the predetermined mathematical operation based, at least in part, upon the selected one of the alignments of the piece of data.

20. The method of claim 17, wherein determining, based at least in part upon an active instruction whether to transfer the piece of data to an execution unit, or to generate the resultant based upon the piece of data comprises:
  selecting to generate the resultant if the active instruction indicates that both a load operation and the predetermined mathematical operation are to be performed.

* * * * *